April 2, 1940.  E. H. STREAM  2,195,944
SCARFING TORCH ROD FEEDER
Filed June 27, 1938
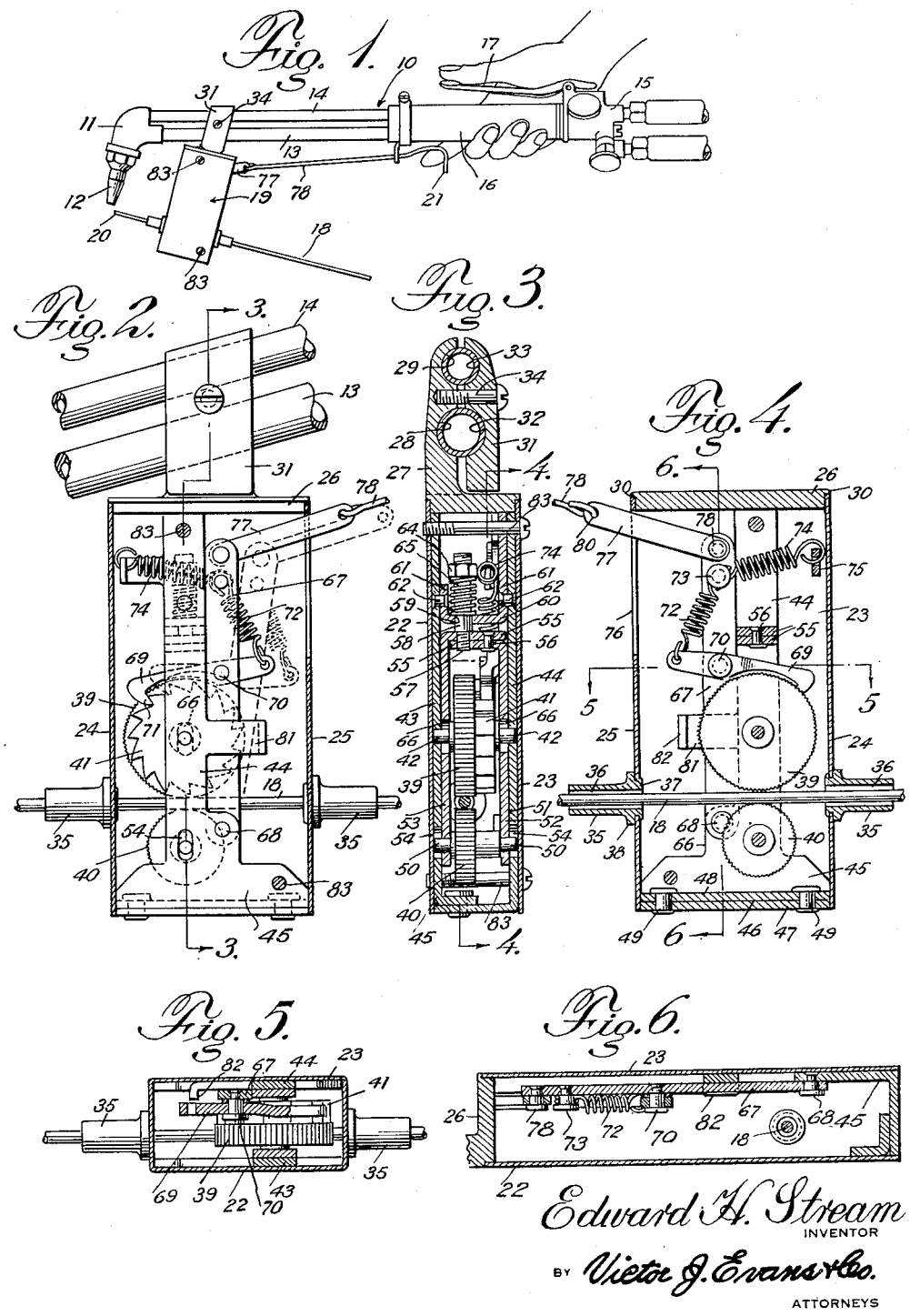
Edward H. Stream
INVENTOR
BY Victor J. Evans & Co.
ATTORNEYS Patented Apr. 2, 1940

2,195,944

UNITED STATES PATENT OFFICE 2,195,944

SCARFING TORCH ROD FEEDER

Edward H. Stream, Chicago, Ill.

Application June 27, 1938, Serial No. 216,180

4 Claims. (Cl. 113—109)

My invention relates to the art of welding and includes among its objects and advantages the provision of an improved scarfing torch rod feeder.

An object of my invention is to provide a scarfing torch rod feeder designed to effectively handle rods of different sizes, in which the rod feeding mechanism is so designed as to compensate structural irregularities in the rod, thus eliminating the necessity of making adjustments to attain proper feed delivery of the rod.

Another object is to provide a device of the type described which is so designed as to be readily attached to conventional blow torches.

A further object is to provide a rod feeder including a positively driven feed wheel rotating about a stationary axis together with a companion feed wheel of the idler type rotating about a shiftable axis together with means for shifting the companion feed wheel for accommodating rods of different diameters.

With these and other objects in view, this invention consists in certain novel features of construction, combination and arrangement of parts to be hereinafter more fully described and claimed.

For a complete understanding of my invention, reference is to be had to the following description and accompanying drawing, in which:

Figure 1 is an elevational view of a scarfing torch showing my invention applied thereto;

Figure 2 is an enlarged view of the invention with certain parts broken away for the sake of clearness;

Figure 3 is a sectional view along the line 3—3 of Figure 2;

Figure 4 is a sectional view along the line 4—4 of Figure 3;

Figure 5 is a sectional view along the line 5—5 of Figure 4; and

Figure 6 is a sectional view along the line 6—6 of Figure 4.

In the embodiment selected to illustrate my invention I make use of a scarfing torch 10, which is of conventional design and well-known in the art. Torch 10 includes the usual head 11 and nozzle 12. The head 11 is with the usual cutting oxygen tube 13 and the usual oxygen and mixture tube assembly 14. Tubes 13 and 14 are connected with the valve body 15 which in turn is connected with the oxy-acetylene equipment not shown. The handle 16 is mounted on the tubes 13 and 14 adjacent the valve body 15. The torch includes the usual cutting valve lever assembly 17. Since the torch is well-known in the art, the construction need not be described in further detail.

In Figure 1 I illustrate the welding rod at 18 which passes through my feeder 19 for delivering the end 20 of the rod into operating relation with the nozzle 12. Rod 18 is supported in right-angular relation to the nozzle 12 and the feeder 19 is actuated through the medium of a trigger 21 arranged in close relation with the handle 16 so as to be accessible by the forefinger of the hand grasping the handle the thumb of which hand manipulates the lever 17. It will thus be seen that my invention is so related to the torch as to permit torch and feeder operation with one hand.

Specifically the feeder 19 comprises a casing including side walls 22 and 23 and narrow side walls 24 and 25. The casing is rectangular in cross section and open at its ends. The upper end of the casing is closed by a body 26 having a wall 27 recessed at 28 and 29 to receive the tubes 13 and 14, respectively. Body 26 is pressed into the casing and includes a flange 30 arranged to abut the upper ends of the walls 22, 23, 24, and 25. A clamp part 31 is associated with the wall 27 and is recessed at 32 and 33 for embracing the tubes 13 and 14 oppositely of the recesses 28 and 29 in the wall. Clamp part 31 is brought into clamping relation with the tubes 13 and 14 through the medium of a screw 34 which passes loosely through the clamped part 31 and is threaded into the wall 27. According to Figure 3 it will be noted that the clamp part 31 is spaced from the wall 27 so as to insure an effective clamping action on the tubes 13 and 14. My invention may be adjusted along the tubes 13 and 14 to secure proper location after which the feeder is fixedly related to the tubes through mere tightening of the screw 34.

In Figure 4 I illustrate the walls 25 and 24 as being provided with tubes 35 which have openings 36 for loosely receiving the welding rods 18 for driving purposes. Tubes 35 include shanks 37 which are pressed through openings in the walls 25 and 24 and the shanks riveted for drawing the flanges 38 tightly against their respective walls and securing the tubes. The welding rod 18 passes between feed wheels 39 and 40. Wheel 39 is positively rotated through the medium of the trigger 21 and rotates about a stationary axis, while feed wheel 40 is resiliently urged in the direction of the wheel 39 for establishing pressure relation between the welding rod 18 and the two feed wheels. Figure 3 illustrates the wheel 39 as including a ratchet wheel 41, which is fixedly connected to the wheel 39. Wheel 39 includes trunnions 42 which are rotatably journaled in openings in bars 43 and 44 lying adjacent the walls 22 and 23, respectively.

Bars 43 and 44 are substantially coextensive in length with the walls 22 and 23 and are widened at their lower ends, as at 45, and arranged in overlapping relation at 46 by reason of the right-angular reaches 47 and 48, which reaches are connected into a unitary structure by rivets 49. It will thus be seen that the reaches 47 and 48, particularly the reach 47, constitute a closure for the lower ends of the casing. Wheel 40 includes trunnions 50 which are rotatably journaled in a yoke 51, comprising bars 52 and 53. Bars 43 and 44 are slotted at 54 to permit relative movement of the trunnions 50 through shifting of the yoke 51.

Bars 52 and 53 include overlapping right-angular reaches 55 which are connected into a unitary structure by a rivet 56. Reaches 55 are provided with a fitted opening for receiving the threaded end 57 at one end of a shaft 58. Shaft 58 is slidable through an opening 59 in a cross piece 60 interconnecting the bars 43 and 44. The interconnecting piece 60 is flanged at 61 and the flanges are secured to the said 43 and 44 by rivet 62. The upper end of the shaft 58 is threaded at 63 for connection with a nut 64 between which ends the interconnecting piece 60 are interposed a compression spring 65. The bars 52 and 53 of the yoke 51 is slotted at 66 to accommodate the trunnions 42, thus permitting relative movement between the yokes and the trunnions. It will thus be seen that the yoke 51 which carries the idler feed wheel 40 is shiftable longitudinally of the straps 43 and 44 and that the tension of the spring 65 is therefore effective on the idler wheel 40 for establishing pressure relation between the welding-rod 18 and the feed wheels 39 and 40. Rotation of the feed wheel 39 will shift the welding rod 18.

To the lateral extension 66 of the bar 44 pivotally connect the lever 67 as at 68. The dog 69 otally connects the lever 67 as at 68. The dog 69 is pivotally connected at 70 with the lever 67 and has its hook 71 arranged in operative relation with the ratchet 41 (see Fig. 2). The pivotal axis 70, of the dog 69, is located intermediate the ends of the dog. To the end opposite the hook 71 I connect one end of the tension spring 72, the other end of which is connected with a pin 73 anchored to the lever 67. The tension spring 74 has one end connected with the pin 73 and its opposite end connected with a bracket 75 comprising an extension of the bar 44. Wall 25 is slotted at 76 for accommodating a link 77 pivotally connected at 78 with the lever 67. The trigger 21 comprises a wire 78 connected with the link 77 as at 80.

Bar 44 includes an extension 81 having an abutment 82 arranged in the path of the lever 67. In operation a pull on the trigger 21 imparts pivotal movement to the lever 67 as illustrated in dotted lines in Figure 2. Thus movement of the lever imparts rotation to the wheel 39 which rotation moves the welding rod 20 into proper position with the nozzle 12. Abutment 82 constitutes a stop for the lever 67 to limit the rotary movement of the wheel 39. Shifting the lever 67 into abutting relation with the abutment 82 rotates the wheel 39 sufficiently far to bring the hook 71 of the dog 69 into holding relation with the next tooth of the ratchet. The outer end of the hook 71 is curved to have camming relation with the teeth of the ratchet. Spring 72 yields to accommodate such camming action but operates to hold the hook 71 in effective connected relation with successive teeth on the ratchet. Spring 74 yieldably holds the lever 67 in the normal full-line position of Figure 2 but the spring yields easily in response to a finger pull on the trigger 21.

My feeder operates in an efficient manner to handle rods of different sizes. The feed pressure relation between the wheels 39 and 40 may be varied through mere adjustment of the nut 64. Surface irregularities or deformations in the welding rod are compensated because of the resilient mounting of the yokes 51. One pull on the trigger 21 consummates delivery of the welding rod 18 of predetermined distance which distance is equal in all cases because of the abutting relation between the lever 67 and the abutment 82.

Bolts 83, pass through the wall 23, and the bar 44, as well as through the bar 43 and has threaded relation with the wall 22 for connecting the box or casing to the inside structure. Tightening of the upper bolt 83 will cause the walls 22 and 23 to have additional pressure relation with the body 26. The casing may be removed for lending accessibility to the inside mechanism by merely removing the bolt 83 and pulling the inside mechanism out of the casing.

What is claimed is:

1. In a scarfing torch, a welding rod feeder mechanism comprising spaced side members, a yoke slidably disposed between said side members, a wheel keyed to a shaft rotatably journaled in said yoke with the shaft having its ends extending into slots in said side members, a second wheel keyed to a shaft rotatably journaled in said side members, with said yoke slotted for the reception of said last-named shaft, a bracket relatively fixed to at least one of said side members, resilient means cooperable with said bracket and said yoke for yieldingly drawing said first wheel toward the other wheel, said two wheels being arranged to receive a welding rod therebetween for feeding the rod through rotation of the wheels, means for varying the strength of said resilient means, a ratchet wheel fixedly related to said second-named wheel, a pawl operatively related to said ratchet wheel and pivotally connected with a lever having one end pivotally connected with one of said side members, spring means operatively connecting the pawl with said lever and the lever with a fixed support for holding the pawl and the lever in normal positions, an actuating element connected with the other end of said lever for pivoting the same to effect actuation of the pawl and rotation of said second-named wheel, and a housing enclosing the welding rod feeder mechanism detachably connected with said side members.

2. In a scarfing torch, a welding rod feeder mechanism comprising spaced side members, a yoke slidably disposed between said side members, a wheel keyed to a shaft rotatably journaled in said yoke with the shaft having its ends extending into slots in said side members, a second wheel keyed to a shaft rotatably journaled in said side members, with said yoke slotted for the reception of said last-named shaft, resilient means acting on said yoke for yieldingly drawing said two wheels together, said two wheels being arranged to receive a welding rod therebetween for feeding the rod through rotation of said second wheel, a ratchet wheel keyed on said last-named shaft, a pawl operatively related to said ratchet wheel and pivotally connected with a lever having one end pivotally connected with one of said side members, spring means operatively connecting the pawl with said lever and the lever with a fixed support for holding the pawl and the lever in normal positions, and an actuating element connected with the other end of said lever for pivoting the same to effect actuation of the pawl and rotation of the wheels.

3. In a scarfing torch, a welding rod feeder mechanism comprising spaced side members, a yoke slidably disposed between said side members, a wheel keyed to a shaft rotatably journaled in said yoke with the shaft having its ends extending into slots in said side members, a second wheel keyed to a shaft rotatably journaled in said side members, with said yoke slotted for the reception of said last-named shaft, resilient means acting on said yoke for yieldingly drawing said two wheels together, said two wheels being arranged to receive a welding rod therebetween for feeding the rod through rotation of said second wheel, a ratchet wheel keyed on said last-named shaft, a pawl operatively related to said ratchet wheel and pivotally connected with a lever having one end pivotally connected with one of said side members, spring means operatively connecting the pawl with said lever and the lever with a fixed support for holding the pawl and the lever in normal positions, an actuating element connected with the other end of said lever for pivoting the same to effect actuation of the pawl and rotation of the wheels, said side members including a rectangularly shaped connecting means at one end, an open ended housing for enclosing the feeder mechanism, with said rectangularly shaped connecting member constituting an end wall for the housing, a closure body for the other end of the housing, and means carried by the closure body for connection with a scarfing torch.

4. In a scarfing torch, a welding rod feeder mechanism comprising spaced side members, a yoke slidably disposed between said side members, a wheel keyed to a shaft rotatably journaled in said yoke with the shaft having its ends extending into slots in said side members, a second wheel keyed to a shaft rotatably journaled in said side members, with said yoke slotted for the reception of said last-named shaft, resilient means acting on said yoke for yieldingly drawing said two wheels together, said two wheels being arranged to receive a welding rod therebetween for feeding the rod through rotation of said second wheel, a ratchet wheel keyed on said last-named shaft, a pawl operatively related to said ratchet wheel and pivotally connected with a lever having one end pivotally connected with one of said side members, spring means operatively connecting the pawl with said lever and the lever with a fixed support for holding the pawl and the lever in normal positions, an actuating element connected with the other end of said lever for pivoting the same to effect actuation of the pawl and rotation of the wheels, said side members including a rectangularly shaped connecting means at one end, an open ended housing for enclosing the feeder mechanism, with said rectangularly shaped connecting member constituting an end wall for the housing, a closure body for the other end of the housing, means carried by the closure body for connection with a scarfing torch, said scarfing torch including a nozzle and a grip spaced from the nozzle, the welding rod mechanism being located between the nozzle and the grip, and a trigger element operatively connected with said actuating element to operate the pawl from a position remote from the nozzle and the feeder mechanism.

EDWARD H. STREAM.